United States Patent [19]

Suetsugu et al.

[11] Patent Number: 5,175,213

[45] Date of Patent: Dec. 29, 1992

[54] STYRENE-BASED RESIN COMPOSITION

[75] Inventors: Yoshiyuki Suetsugu; Yutaka Tsubokura; Kazuo Sato, all of Ichihara, Japan

[73] Assignee: Idemitsu Petrochemical Co., Ltd., Tokyo, Japan

[21] Appl. No.: 532,921

[22] Filed: Jun. 4, 1990

[30] Foreign Application Priority Data

Jun. 23, 1989 [JP] Japan .................................. 1-159488

[51] Int. Cl.$^5$ ..................... C08L 53/02; C08L 25/04
[52] U.S. Cl. ....................................... 525/89; 525/88; 525/98; 525/99; 525/241
[58] Field of Search ................ 525/89, 241, 88, 98, 525/99

[56] References Cited

U.S. PATENT DOCUMENTS

| | | | |
|---|---|---|---|
| 3,906,057 | 9/1975 | Durst | 260/876 B |
| 3,906,058 | 9/1975 | Durst | 525/97 |
| 4,195,136 | 3/1980 | Sato et al. | 525/71 |
| 4,267,283 | 5/1981 | Whitehead | 525/89 |
| 4,839,418 | 6/1989 | Schwaben et al. | 525/53 |

FOREIGN PATENT DOCUMENTS

| | | | |
|---|---|---|---|
| 0135167 | 3/1985 | European Pat. Off. | 525/89 |
| 52-71549 | 6/1977 | Japan . | |
| 63-48317 | 3/1988 | Japan . | |
| 63-165413 | 7/1988 | Japan . | |
| 1-279943 | 11/1989 | Japan . | |

Primary Examiner—James J. Seidleck
Assistant Examiner—W. R. M. Clark
Attorney, Agent, or Firm—Frishauf, Holtz, Goodman & Woodward

[57] ABSTRACT

A styrene-based resin composition comprising (A) a styrene-based polymer and (B) a rubber-like polymer dispersed in the styrene-based polymer. The dispersed particles of the rubber-like polymer comprise a styrene-butadiene-based block copolymer comprising 5 to 95% by weight of a conventional diblock-type polymer and 95 to 5% by weight of a tapered block-type polymer, wherein the butadiene unit content of the styrene-butadiene-based block copolymer is 6 to 16% by weight, based on the weight of the composition. The particles have a weight ratio of gel content to rubber-like polymer of 1.1:1 to 4.0:1 and have a swelling index of 5 to 20. The particles have an area average diameter of 0.1 to 0.9 μm, with a ratio of area particle diameter to number average particle diameter of 1.0 to 1.8. The styrene-based resin composition has a high Izod impact strength and a high drop-weight impact strength, and further has excellent gloss and stiffness properties.

19 Claims, No Drawings

STYRENE-BASED RESIN COMPOSITION

BACKGROUND OF THE INVENTION

1. Field of the Invention

The present invention relates to a novel styrene-based resin composition. More particularly, it is concerned with a styrene-based resin composition which is excellent in a physical balance; for example, has a high Izod impact strength, and a high drop-weight impact strength, and further excellent in gloss and stiffness, and thus is suitable as a material for production of office automation (OA) devices, home electric applicances, sheets, and so forth.

2. Background Information

In recent years, for housings of TV sets, a styrene-based resin composition excellent in a well balanced manner in physical properties, such as gloss, Izod impact strength, drop-weight impact strength, and stiffness has been increasingly demanded.

For the purpose of improving impact resistance of a styrene-based resin, the blending of a rubber-like polymer with polystyrene, and polymerization of styrene in the presence of a rubber-like polymer to cause graft polymerization of part of styrene onto the rubber-like polymer and polymerization of the remaining styrene into polystyrene, thereby forming a so-called rubber-modified polystyrene resin composition in which the rubber-like polymer/styrene graft polymer and the polystyrene are in a mixed state have been employed on a commercial scale.

It is known that use of a conventional diblock-type styrene-butadiene copolymer or a tapered block-type styrene-butadiene copolymer as the above rubber-like polymer increase the impact strength. For example, impact resistant polystyrene using a full block-type styrene-butadiene copolymer as the rubber-like polymer (Japanese Patent Application Laid-Open No. 165413/1988 and Japanese Patent Application No. 311530/1987), an impact resistant polystyrene using a tapered block-type styrene-butadiene copolymer (Japanese Patent Application Laid-Open Nos. 71549/1977 and 48317/1988), and so forth are disclosed.

These impact resistant polystyrenes, however, are not always sufficiently satisfactory in all of physical properties such as gloss, Izod impact resistance, drop-weight impact strength, and stiffness.

It is also known that in a rubber-modified polystyrene resin composition, the usual rubber-like polymer is dispersed in the styrene-based polymer in the form of particles, and that the particle size is in a close relationship with impact resistance, stiffness, and gloss. Namely, as the particle size is smaller, stiffness and gloss are higher. On the contrary, as the particle size is decreased, impact resistance is reduced, and above a certain limit, the effect of improving impact resistance is substantially lost.

SUMMARY OF THE INVENTION

The object of the present invention is to provide a styrene-based resin composition which has a high Izod impact strength and a high drop-weight impact strength, and is excellent in gloss and stiffness, and thus which is well balanced in physical properties.

As a result of investigations to develop a styrene-based resin composition excellent in the above physical property balance, it has been found that the object can be attained by dispersing a styrene-butadiene-based block copolymer as a rubber-like polymer in a styrene-based polymer in such a manner that the ratio of conventional diblock-type polymer to tapered block-type polymer, and the butadiene unit content are in specified ranges, and further by specifying the gel content of rubber-like polymer particles dispersed, a swelling index, a particle diameter, and a particle diameter distribution.

The present invention relates to a styrene-based resin composition comprising (A) a styrene-based polymer and (B) a rubber-like polymer dispersed in the styrene-based polymer (A), wherein dispersed particles of said rubber-like polymer (a) comprises a styrene-butadiene-based block copolymer in which 5 to 95% by weight is conventional diblock-type copolymer and 95 to 5% by weight is tapered block-type copolymer, and contains in the composition in a proportion that the butadiene unit content is 6 to 16% by weight based on the weight of the composition, and (b) the area average particle diameter is 0.1 to 0.9 μm, and the ratio of area average particle diameter to number average particle diameter is 1.0 to 1.8.

The weight ratio of gel content to rubber-like polymer is 1.1:1 to 4.0:1, and the swelling index of the composition being 5 to 20.

DETAILED DESCRIPTION OF THE INVENTION

A styrene-based polymer as the component (A) of the composition of the present invention may be a styrene homopolymer or a copolymer of styrene and a monomer copolymerizable with styrene. Monomers copolymerizable with styrene include aromatic monovinyl compounds such as α-methylstyrene, vinyltoluene, vinylethylbenzene, vinylxylene, p-tert-butylstyrene, α-methyl-p-methylstyrene, and vinylnaphthalene. acrylonitrile. methyl methacrylate, methyl acrylate, methacrylic acid, acrylic acid, maleic anhydride, and phenylmaleimide. These monomers can be used singly or in combination with each other. The amount of the monomer used is usually not more than 50% by weight based on the total weight of all monomers including styrene, with the range of not more than 40% by weight being preferred.

As the rubber-like polymer as the component (B), a styrene-butadiene-based block copolymer is used. This styrene-butadiene-based block copolymer comprises a styrene unit and a 1,3-butadiene unit. In this copolymer, if desired, part of the styrene unit may be replaced by a vinyl-based monomer unit copolymerizable with styrene, in a proportion of not more than 50% by weight, preferably not more than 40% by weight based on the total vinyl-based monomer unit, or part of the 1,3-butadiene unit may be replaced by a diolefin unit other than 1,3-butadiene, in a proportion of not more than 50% by weight, preferably not more than 40% by weight based on the total diolefin-based monomer unit, or both the styrene unit and the 1,3-butadiene unit may be replaced at the same time in the same manner as above.

As vinyl-based monomers copolymerizable with styrene, monomers listed for the styrene-based polymer as the component (A) can be used. These monomers can be used singly or in combination with each other. As diolefins other than 1,3-butadiene, isoprene, 1,3-pentadiene, 2,3-dimethyl-1,3-butadiene, 2-ethyl-1,3-butadiene, 2,3-diethyl-1,3-butadiene, 2,3-diphenyl-1,3-butadiene, and the like can be used. These monomers can be used singly or in combination with each other.

The styrene-butadiene-based block copolymer is preferably such that the weight ratio of the total vinyl-based monomer unit to the total diolefin-based monomer unit is in a range of 10:90 to 50:50. If the total vinyl-based monomer unit content is less than the above specified range, the gloss of the resin composition is reduced. On the other hand, if it is above the above range, impact resistance is reduced.

The average molecular weight of the styrene-butadiene-based block copolymer is preferably 50,000 to 300,000. If the average molecular weight is less than 50,000, impact resistance of the resin composition is poor. On the other hand, if it is more than 300,000, fluidity at the time of molding is unsufficiently low. The weight average molecular weight of the polymer block portion composed of styrene, or a styrene and a vinyl-based monomer to be used, if desired, is 15,000 to 150,000 and preferably 20,000 to 140,000. If the weight average molecular weight of the block portion is less than 15,000, the gloss of the resin composition is poor. On the other hand, if it is more than 150,000, the impact resistance is poor.

Of these styrene-butadiene-based block copolymers, a block copolymer obtained using styrene alone as the vinyl-based monomer and 1,3-butadiene alone as the diolefin monomer (SB block copolymer) is particularly preferred. This block copolymer can be produced by the known method (Japanese Patent Application Laid-Open No. 157493/1975 and Japanese Patent Publication No. 19031/1979).

That is, this block copolymer can be produced by co-polymerizing styrene and 1,3-butadiene in the presence of an organolithium catalyst, in an inert hydrocarbon solvent such as hexane, heptane, benzene, and the like in such a manner that styrene and 1,3-butadiene are copolymerized into the conventional diblock-type or the tapered block-type. The conventional diblock-type as used herein refers to a styrene-butadiene-based block copolymer having the composition that the styrene unit content changes intermittently to the butadiene unit content along the polymer chain of the copolymer. On the other hand, the tapered block-type as used herein refers to a styrene-butadiene-based copolymer having the composition that the styrene unit content continuously decreases along the polymer chain of the copolymer.

A conventional diblock-type styrene-butadiene-based copolymer and a tapered block-type styrene-butadiene-based copolymer can be distinguishable over each other by the following method.

The proton fraction of a glass-like portion (corresponding to a styrene chain portion) and a rubber-like portion are determined by the broad band high-power pulse NMR. And then the fraction of the polystyrene block is determined by referring to the amount of the styrene charged at the time of polymerization of the copolymer from the following equation:

$$\text{(Proton Fraction of Polystyrene Block (\%))} = \frac{(X/100) \cdot (n_S/m_S)}{(X/100) \cdot (n_S/m_S) + [1 - (X/100)] \cdot (n_B/m_B)} \times 100 \quad \text{(I)}$$

wherein
X = amount of styrene charged (wt %)

$m_S$: molecular weight of styrene (per structure unit)
$m_B$: molecular weight of butadiene (per structural unit)
$n_S$: number of protons of styrene (per structural unit)
$n_B$: number of protons of butadiene (per structural unit).

By comparing the proton fraction of the glass-like portion determined by broad band high-power pulse NMR with the proton fraction of the polystyrene block as determined above, the conventional diblock-type styrene-butadiene-based copolymer and a tapered block-type styrene-butadiene-based copolymer can be distinguishable over each other. When there is a tapered portion, since part of the styrene charged is contained in the styrene-butadiene random copolymer portion (i.e. tapered portion), the proton fraction of the glass-like component as determined becomes smaller than the theoretical value of the proton fraction of the polystyrene block as determined by referring to amount of the styrene charged.

In the present invention, if the difference is not less than 5%, it is referred to as a tapered block-type styrene-butadiene-based copolymer. On the other hand, if it is less than 5%, it is referred to as a conventional diblock-type styrene-butadiene-based copolymer. Moreover, whether a copolymer is of the tapered block-type or of the conventional diblock-type can be determined by the presence or absence of a signal ascribable to a styrene butadiene random copolymer in the $^{13}$C-NMR analysis.

In the composition of the present invention, it is necessary that a styrene-butadiene-based block copolymer as the component (B) is dispersed in a styrene-based polymer as the component (A) so that the ratios of the conventional diblock-type and the tapered block-type to the copolymer (styrene-butadiene-based block copolymer) are 5 to 95% by weight and 95 to 5% by weight, respectively and preferably 10 to 90% by weight and 90 to 10% by weight. If the conventional diblock-type copolymer is less than 5% by weight, the effect of increasing stiffness is not sufficiently exhibited. On the other hand, if it is more than 95% by weight, the effect of increasing a drop-weight impact strength is not sufficiently obtained.

In the composition of the present invention, it is necessary that the above styrene-butadiene-based block copolymer is dispersed in a styrene-based copolymer as the component (A) so that the butadiene unit content of the composition is 6 to 16% by weight and preferably 8 to 14% by weight. If the butadiene unit content is less than 6% by weight, impact resistance is poor. On the other hand, it is more than 16% by weight, gloss and stiffness are decreased. This butadiene unit content can be calculated from the equation:

$$W_{PB} \text{ (wt \%)} = \frac{W_{SB}}{(1 - W_{SB})y + W_{SB}} \times K \times 100 \quad \text{(II)}$$

wherein
$W_{PB}$ = butadiene unit content
$W_{SB}$ = weight fraction of SB block copolymer charged at the time of polymerization
y = conversion of styrene
K = weight fraction of the butadiene unit in the SB block copolymer (which can be determined by IR).

In the styrene-butadiene block copolymer, when a diolefin unit other than the 1,3-butadiene unit is contained as well as the 1,3-butadiene unit, the above butadiene unit refers to a butadiene unit containing another diolefin unit.

In the composition of the present invention, particles of the rubber-like polymer dispersed as the component (B) are required to have a specified micro structure. That is, it is necessary that the weight ratio of the gel content to the rubber-like polymer is in the range of 1.1:1 to 4.0:1, preferably 1.4:1 to 3.6:1 and that the swelling index is the range of 5 to 20 and preferably 7 to 18. If the amount of gel is less than 1.1:1, impact resistance is not sufficiently high. On the other hand, if it is more than 4.0:1, there is a danger that gloss is decreased. If the swelling index is not within the above specified range, the impact strength tends to be decreased.

In the composition of the present invention, for the rubber-like polymer particles dispersed as the component (B), it is necessary that the area average particle diameter is in a range of 0.1 to 0.9 $\mu$m, preferably 0.2 to 0.6 $\mu$m, and that the ratio of area surface average particle diameter to number average particle diameter is in a range of 1.0 to 1.8, preferably 1.0 to 1.6. If the area average particle diameter is less than 0.1 $\mu$m, impact resistance is not sufficiently high. On the other hand, if it is more than 0.9 $\mu$m, the gloss decreases. If the ratio of the area average particle diameter to the number average particle diameter is more than 1.8, there is a tendency that the gloss decreases.

In preparation of the styrene-based resin composition of the present invention, a rubber-modified styrene-based resin with a conventional diblock-type styrene-butadiene-based copolymer dispersed therein and a rubber-modified styrene-based resin with a tapered block-type styrene-butadiene-based copolymer dispersed therein may be separately prepared and then blended in a predetermined ratio, or a conventional diblock-type styrene-butadiene-based copolymer and a tapered block-type styrene-butadiene-based copolymer may be added in a predetermined ratio at the time of polymerization to obtain a rubber-modified styrene-based resin composition. Moreover, a rubber-modified styrene-based resin composition may be obtained by mixing a low conversion reaction mixture of a conventional diblock-type styrene-butadiene-based copolymer and a low conversion reaction mixture of a tapered block-type styrene-butadiene-based copolymer in a predetermined ratio, and then polymerizing the resulting mixture.

A method of polymerization for production of the above rubber-modified styrene-based resin is not critical; the rubber-modified styrene-based resin can be produced by the conventional method such as an emulsion polymerization method, a bulk polymerization method, a solution polymerization method, a suspension polymerization method, or a multi-stage polymerization method such as a bulk-suspension two stage polymerization method.

A suitable method of production of the above rubber-modified styrene-based resin by the bulk-suspension two stage method will hereinafter be explained.

A conventional diblock-type styrene-butadiene copolymer, or a tapered block-type styrene-butadiene copolymer, or both of them are added to styrene or a mixture of styrene and a monomer copolymerizable with styrene, and dissolved therein by heating, if necessary. It is preferred to dissolve them as uniformly as possible. Then, to the solution thus obtained, a molecular weight controller (chain transfer agent) such as alkylmercaptan, and a polymerization initiator, such as an organic peroxide, to be used, if necessary, are added, and preliminary polymerization is carried out with stirring while heating at a temperature of about 70° to 150° C. by the bulk polymerization method until the degree of polymerization reached 10 to 60%. At this preliminary polymerization step, the rubber-like polymer is dispersed in a particle form by stirring.

Then, the conventional diblock-type styrene-butadiene-based copolymer reaction product, or tapered block-type styrene-butadiene-based copolymer reaction product, or their mixed reaction product as obtained above, or a mixture of a conventional diblock-type styrene-butadiene-based copolymer reaction product and a tapered block-type styrene-butadiene-based copolymer reaction product in a predetermined ratio is suspended in an aqueous layer with calcium triphosphate or polyvinyl alcohol as a suspending agent, and suspension polymerization (main polymerization) is usually carried out until the degree of polymerization approached nearly 100%. If necessary, after the main polymerization step, heating may be continued.

As the above molecular weight controller, $\alpha$-methylstyrene dimer, mercaptans such as n-dodecylmercaptan, tert-dodecylmercaptan, 1-phenylbutene-2-fluorene, dipentene, and chloroform terpenes, halogen compounds, and the like can be used.

As the polymerization initiator to be used, if necessary, organic peroxides exemplified by peroxyketals such as 1,1-bis(tert-butylperoxy)-cyclohexane and 1,1-bis(tert-butylperoxy)3,3,5-trimethylcyclohexane, dialkylperoxides such as dicumyl peroxide, di-tert-butyl peroxide, and 2,5-dimethyl-2,5-di(tert-butylperoxy)hexane, diaryl peroxides such as benzoyl peroxide, and m-toluoyl peroxide, peroxy dicarbonates such as dimyristyl peroxy dicarbonate, peroxy esters such as tert-butylperoxy-isopropyl carbonate, ketone peroxides such as cyclohexanone peroxide, and hydroperoxides such as p-menthane hydroperoxide, and the like can be used.

The particle diameter, particle diameter distribution, and particle structure of the rubber-like polymer can be controlled with the number of revolutions for stirring, the amount of the molecular weight controller used, and so forth. The gel content and the swelling index can be controlled with the type or amount of the catalyst, reaction temperature, reaction time, and so forth.

The slurry thus obtained is treated by the usual technique to take out a bead-like reaction product. This reaction product is dried and then pelletized by the usual method to obtain the desired rubber-modified styrene-based resin.

To the styrene-based resin composition of the present invention, if necessary, various additives usually used, for example, a lubricant such as stearic acid, behenic acid, zinc stearate, calcium stearate, magnesium stearate, or ethylenebisstealoamide, an antioxidant such as organic polysiloxane, mineral oil, or a hindered phenol-based antioxidant such as 2,6-di-tert-butyl-4-methylphenol, stearyl-$\beta$-(3,5-di-tert-butyl-4-hydroxyphenyl) propionate, or triethylene glycol-bis-3-(3-tert-butyl-4-hydroxy-5-methylphenyl)propionate, or a phosphorus-based antioxidant such as tri(2,4-di-tert-butylphenyl)-phosphite or 4,4-butylidene(3-methyl-6-tert-butylphenyl-di-tridecyl)phosphite, and further a ultraviolet absorbing agent, a flame retardant, an antistatic agent, a releasing agent, a plasticizer, a dye, a pigment, various fillers, and so on can be added. In addition, other polymers such as polyphenylene ether can be compounded.

The styrene-based resin composition of the present invention as obtained above is excellent in physical property balance such as impact resistance, gloss, and stiffness, and thus is suitable as a material for OA devices, home electric appliances, and sheets.

In the styrene-based resin composition of the present invention, a styrene-butadiene-based block copolymer as a rubber-like polymer is dispersed in a styrene-based polymer in such a manner that the ratio of the conventional diblock-type to the tapered block-type, and the butadiene unit content are in the specified ranges, and dispersed particles of the rubber-like polymer have the specified gel content, swelling index, particle diameter, and particle diameter distribution.

Thus the styrene-based resin composition of the present invention has a high Izod impact strength and a high drop-weight impact stregnth, and further has excellent gloss and stiffness.

The present invention is described in greater detail with reference to the following examples, although it is not limited thereto.

Physical properties of moldings and characteristics of the composition were determined by the following methods.

(1) Gel Content and Swelling Index

Wc (g) of a sample (rubber-like polymer content, a % by weight) was dissolved in toluene, and after centrifugal separation at 15,000 rpm for 60 minutes, the supernatant was subjected to decantation. Then, the amount of the swollen insoluble portion ($W_s$ (g)) was measured. The swollen insoluble portion was vacuum dried at 60° C. for 24 hours, and the amount of the dry insoluble portion ($W_g$ (g)) was measured.

Gel Content = $W_g/(W_c \times a/100)$

Swelling Index = $W_s/W_g$ (2) Structure of Rubber-Like Polymer Particle, $D_s$, and $D_n$ A sample was dyed with osmic acid. Then, a photograph was taken with a transmission type electron microscope, and the structure of rubber-like polymer particle was observed Ten hundred particles were measured for particle diameter ($D_s$) and number average particle diameter ($D_n$) of 1,000 rubber-like polymer particle were calculated from the following equation.

$D_s = (\Sigma n D^3)/(\Sigma n D^2)$ $D_n = (\Sigma n D)/(\Sigma n)$ (wherein n indicates a number of rubber-like polymer particles having a diameter D).

(3) Butadiene Unit Content

Calculated from the above equation (II).

(4) Distinction between Conventional Diblock-Type SB Copolymer and Tapered Block-Type SB copolymer A pulse (90°x—$\tau$—90°y, 90° pulse width=2 $\mu$s) was applied to a sample by the use of a broad band high-power pulse NMR under the conditions:

apparatus: cxp-90 (manufactured by Bruker Co.)
method: Solid-Echo method
  H nucleus 90 MHz
  temperature: 30° C.

FID (free induction decay) after 90°y pulse was observed, and a proton fraction of a glass-like portion was determined by analysis of FID. If a difference between the proton fraction of the glass-like portion and the theoretical proton fraction of a polystyrene block as calculated from the above equation (I) was not less than 5%, the polymer was referred to as a "tapered block-type SB copolymer", and if the difference was less than 5%, it was referred to as a "conventional diblock-type SB copolymer". In addition, they were distinguished by the presence of a signal ascribable to a styrene-butadiene random polymer portion in $^{13}$C-NMR.

(5) Izod Impact Strength

Determined according to JIS K-7110 (23° C., notched).

(6) Gloss

Determined according to JIS K-7105.

(7) Flexural Modulus

Determined according to ASTM D790.

(8) Melt Index

Determined according to JSO R1133.

(9) Drop-Weight Impact Strength

The energy until an abrupt decrease in force is first observed in a force-displacement curve is determined by the use of a Rheometrics automatic falling weight impact tester RDT 5000 at a point 125 mm from a gate position of a 270× 70×3 mm injection molded plate and at the center of the plate width (700 mm) under conditions of load 3.76 kg, speed 3.5 m/sec, pore diameter of the specimen fixed point 2 inch, and temperature 23° C., and is indicated as a falling weight impact strength.

In the Examples and Comparative Examples, a polymer obtained in Preparation Example 1 was used as the conventional diblock-type SB block copolymer, and as the tapered block-type SB block copolymer, BUNA-BL 6533 (manufactured by Bayer Corp., styrene unit content 40 wt %, Mw=230,000, Mn=209,000) was used. Properties of these SB block copolymers are shown in Table 1.

In Comparative Examples 7and 8, as the conventional diblock-type SB block copolymer, ZLS-01 (manufactured by Nippon Zeon Co., Ltd.) was used.

TABLE 1

| Sample | Amount of Styrene Charged (wt %) | Proton Fraction of PS Block Calculated from Amount of Styrene Charged (%) | Proton Fraction of Glass-Like Portion Measured (%) | Presence of Signal of SB Random Copolymer Portion in $^{13}$C—NMR |
| --- | --- | --- | --- | --- |
| Tapered Block-Type SB Block Copolymer (BUNA-BL6533) | 40 | 31.6 | 20 | Clear |
| Conventional Diblock-Type SB Block Copolymer (Preparation Example 1) | 25 | 18.8 | 18 | Undetectable |

PREPARATION EXAMPLE 1

Production of Conventional Diblock-Type SB Block Copolymer

A 15 wt % n-hexane solution containing 0.07 part by weight of n-butyl lithium was added to a 20 wt % n-hexane solution containing 75 parts by weight of 1,3-butadiene, and polymerization was conducted at 80° C. for 2 hours. After the total 1,3-butadiene was polymerized, 25 parts by weight of styrene was added to polybutadiene having an active terminal, and polymerization was conducted for 2 hours to obtain a solution of a block copolymer consisting of 1,3-butadiene polymer block and a styrene polymer block. To this polymer solution, di-tert-butyl-p-cresol as a stabilizer was added in an amount of 1 part by weight per 100 parts by weight of the copolymer. The solvent was distilled away to isolate the desired copolymer.

In the SB block copolymer thus obtained, no random component was detected, and the styrene unit content was 25% by weight, the weight average molecular weight was 180,000, the number average molecular weight was 160,000, and the molecular weight of the block polystyrene was 60,000.

EXAMPLE 1

462 g of the conventional diblock-type SB block copolymer obtained in Preparation Example 1, 3,000 g of styrene, and 1 g of n-dodecylmercaptan as a chain transfer agent were placed in a 5-liter autoclave, and reacted at 130° C. for 4 hours while stirring at 300 rpm.

Then, 3,000 g of the above reaction mixture, 3,000 g of water, 10 g of polyvinyl alcohol as a suspension stabilizer, and 6 g of benzoyl peroxide and 3 g of dicumyl peroxide as polymerization initiators were placed in a 10-liter autoclave, and then heated from 80° C. to 140° C. at a rate of 30° C./hr while stirring at 500 rpm and reacted at 140° C. for 4 hours to obtain rubber-modified polystyrene beads.

Separately, using 600 g of the tapered block-type SB block copolymer, polymerization was carried out in the same manner as above to obtain rubber-modified polystyrene beads.

Then, the conventional diblock-type and tapered block-type rubber-modified polystyrenes obtained above were blended in a weight ratio of 30:70 in a uniaxial extruder maintained at 220° C. and after pelletizing, molded. The results are shown in Table 2.

EXAMPLE 2

Rubber-modified polystyrene was obtained in the same manner as in Example 1 except that the amounts of the conventional diblock-type and tapered block-type SB block copolymers used in polymerization were changed to 68 g and 913 g, respectively. Then, the conventional diblock-type and tapered block-type rubber-modified polystyrenes thus obtained were blended in a weight ratio of 70:30 in a uniaxial extruder maintained at 220° C., and after pelletizing, molded. The results are shown in Table 2.

EXAMPLE 3

Rubber-modified polystyrene was obtained in the same manner as in Example 1 except that the amounts of the conventional diblock-type and tapered block-type SB block copolymers used in polymerization were changed to 358 g and 462 g, respectively. Then, the conventional diblock-type and tapered block-type rubber-modified polystyrenes thus obtained were blended in a weight ratio of 20:80 in a uniaxial extruder maintained at 220° C., and after pelletizing, molded. The results are shown in Table 2.

COMPARATIVE EXAMPLE 1

Rubber-modified polystyrene was obtained in the same manner as in Example 1 except that the amounts of the conventional diblock-type and tapered block-type SB block copolymers used in polymerization were changed to 169 g and 214 g, respectively. Then, the conventional diblock-type and tapered block-type rubber-modified polystyrenes thus obtained were blended in the same ratio as in Example 1 in a uniaxial extruder maintained at 220° C., and after pelletizing, molded. The results are shown in Table 2.

COMPARATIVE EXAMPLE 2

Rubber-modified polystyrene was obtained in the same manner as in Example 1 except that the amounts of the conventional diblock-type and tapered block-type SB block copolymers used in polymerization were changed to 947 g and 1,286 g, respectively. Then, the conventional diblock-type and tapered block-type rubber-modified polystyrenes thus obtained were blended in the same ratio as in Example 1 in a uniaxial extruder maintained at 220° C., and after pelletizing, molded. The results are shown in Table 2.

COMPARATIVE EXAMPLE 3

Only a tapered block-type rubber-modified polystyrene prepared under the same conditions as in Example 1 was pelletized under the same conditions as in Example 1, and then molded. The results are shown in Table 2.

COMPARATIVE EXAMPLE 4

Only a conventional diblock-type rubber-modified polystyrene prepared under the same conditions as in Example 1 was pelletized under the same conditions as in Example 1, and then molded. The results are shown in Table 2.

COMPARATIVE EXAMPLE 5

The procedure of Example 1 was repeated with the exception that the amount of dicumyl peroxide used was changed to 0.5 g. The results are shown in Table 2.

COMPARATIVE EXAMPLE 6

The procedure of Example 2 was repeated with the exception that the number of revolution for stirring in the bulk polymerization was changed to 100 rpm. The results are shown in Table 2.

EXAMPLE 4

Rubber-modified polystyrene was obtained in the same manner as in Example 1 except that 139 g of the conventional diblock-type SB block copolymer and 420 g of the tapered block-type SB block copolymer were added at the same time, and then pelletized and molded in the same manner as in Example 1. The results are shown in Table 2.

EXAMPLE 5

Rubber-modified polystyrene was obtained in the same manner as in Example 1 except that 482 g of the conventional diblock-type SB block copolymer and 274 g of the tapered block-type SB block copolymer were added at the same time, and then pelletized and molded in the same manner as in Example 1. The results are shown in Table 2.

COMPARATIVE EXAMPLE 7

Rubber-modified polystyrene was obtained in the same manner as in Example 1 except that 51 g of the conventional diblock-type SB block copolymer and 150 g of the tapered block-type SB block copolymer were added at the same time, and then pelletized and molded in the same manner as in Example 1. The results are shown in Table 2.

COMPARATIVE EXAMPLE 8

The procedure of Example 4 was repeated with the exception that the amount of dicumyl peroxide used was changed to 0.5 g. The results are shown in Table 2.

COMPARATIVE EXAMPLE 9

The procedure of Example 5 was repeated with the exception that the number of revolutions for stirring in the bulk polymerization was changed to 100 rpm. The results are shown in Table 2.

EXAMPLE 6

462 g of the conventional diblock-type SB block copolymer, 3,000 g of styrene, and 1 g of n-dodecylmercaptan as a chain transfer agent were placed in a 5-liter autoclave, and reacted at 130° C. for 4 hours while stirring at 300 rpm to obtain a reaction mixture of low conversion.

Separately, using 600 g of the tapered block-type SB block copolymer, a reaction mixture of low conversion was obtained in the same manner as above.

Then, the above two reaction mixtures were placed i a 10-liter autoclave in an equal amount, and then polymerized in the same manner as in Example 1 to obtain rubber-modified polystyrene beads. These beads were pelletized and molded by the use of a uniaxial extruder maintained at 220° C. The results are shown in Table 2.

EXAMPLE 7

The procedure of Example 6 was repeated with the exception that the amounts of the conventional diblock-type and tapered block-type SB block copolymers were changed to 689 g and 913 g, respectively. The results are shown in Table 2.

COMPARATIVE EXAMPLE 10

The procedure of Example 6 was repeated with the exception that the amounts of the conventional diblock-type and tapered block-type SB block copolymers were changed to 169 g and 214 g, respectively. The results are shown in Table 2.

COMPARATIVE EXAMPLE 11

The procedure of Example 6 was repeated with the exception that the amount of dicumyl peroxice used was changed to 0.5 g. The results are shown in Table 2.

TABLE 2

| | Butadiene Unit Content (wt %) | Proportion of Diblock-Type SB Compounded (wt %) | Gel Content* | Swelling Index | Ds (μm) | Ds/Dn | Gloss (%) | Flexural Modulus (kg/cm$^2$) | Izod Impact Strength (kg · cm/cm) | Drop-Weight Impact Strength (J) | MI (g/10 min) |
| --- | --- | --- | --- | --- | --- | --- | --- | --- | --- | --- | --- |
| Example 1 | 10 | 30 | 2.1 | 13 | 0.4 | 1.6 | 96 | 24900 | 10.2 | 9 | 2.8 |
| Example 2 | 14 | 70 | 2.4 | 12 | 0.4 | 1.4 | 97 | 23100 | 10.1 | 8 | 2.2 |
| Example 3 | 8 | 20 | 3.6 | 11 | 0.4 | 1.2 | 97 | 24200 | 9.2 | 8 | 3.2 |
| Comparative Example 1 | 4 | 30 | 2.4 | 12 | 0.4 | 1.5 | 96 | 26800 | 4.6 | 0.5 | 4.2 |
| Comparative Example 2 | 18 | 70 | 2.5 | 13 | 0.4 | 1.3 | 96 | 15900 | 11.2 | 8 | 2.0 |
| Comparative Example 3 | 10 | 0 | 1.5 | 12 | 0.4 | 1.2 | 95 | 19000 | 9.7 | 13 | 2.2 |
| Comparative Example 4 | 10 | 100 | 2.6 | 12 | 0.3 | 1.5 | 97 | 28200 | 9.6 | 0.6 | 2.3 |
| Comparative Example 5 | 10 | 30 | 1.0 | 22 | 0.4 | 1.6 | 96 | 24700 | 4.2 | 1 | 2.8 |
| Comparative Example 6 | 14 | 70 | 2.5 | 13 | 1.0 | 1.7 | 78 | 19000 | 11.0 | 10 | 2.2 |
| Example 4 | 10 | 30 | 2.3 | 12 | 0.4 | 1.5 | 96 | 25100 | 9.2 | 7 | 2.9 |
| Example 5 | 14 | 70 | 2.4 | 11 | 0.5 | 1.5 | 93 | 24200 | 11.8 | 10 | 2.3 |
| Comparative Example 7 | 4 | 30 | 2.3 | 13 | 0.4 | 1.4 | 97 | 27000 | 4.2 | 0.8 | 4.1 |
| Comparative Example 8 | 10 | 30 | 1.0 | 12 | 0.3 | 1.3 | 96 | 23900 | 5.1 | 0.2 | 2.7 |
| Comparative Example 9 | 14 | 70 | 2.1 | 13 | 1.0 | 1.7 | 82 | 20000 | 11.2 | 9 | 2.9 |
| Example 6 | 10 | 50 | 2.2 | 12 | 0.4 | 1.5 | 96 | 25300 | 10.8 | 10 | 2.9 |
| Example 7 | 14 | 50 | 2.3 | 13 | 0.4 | 1.4 | 96 | 23000 | 10.5 | 11 | 2.4 |
| Comparative Example 10 | 4 | 50 | 2.4 | 12 | 0.4 | 1.4 | 96 | 26900 | 4.1 | 0.2 | 4.2 |
| Comparative Example 11 | 10 | 50 | 2.3 | 28 | 0.4 | 1.5 | 96 | 24800 | 3.6 | 0.8 | 2.8 |

*Weight ratio relative to the rubber-like polymer.

What is claimed is:

1. A styrene-based resin composition comprising (A) a styrene-based polymer and (B) rubber-like polymer particles dispersed in the styrene-based polymer (A), wherein said particles of said rubber-like polymer
   (a) comprise a styrene-butadiene-based block copolymer comprising 5 to 95% by weight of a conventional diblock-type polymer and 95 to 5% by weight of a tapered block-type polymer, wherein the styrene-butadiene-based block copolymer has a butadiene unit content of 8 to 16% by weight, based on the weight of the composition, and
   (b) have an area average particle diameter of 0.1 to 0.9 μm, with a ratio of area particle diameter to number average particle diameter being 1.0 to 1.8, said composition having a weight ratio of gel content to rubber-like polymer of 1.1:1 to 4.0:1 and a swelling index of 5 to 20.

2. The styrene-based resin composition as claimed in claim 1, wherein the styrene-based polymer is a styrene homopolymer or a copolymer of styrene and a monomer copolymerizable with styrene.

3. The styrene-based resin composition as claimed in claim 1, wherein the styrene-butadiene-based block copolymer comprises 10 to 90% by weight of a conventional diblock-type polymer and 90 to 10% by weight of a tapered block-type polymer.

4. The styrene-based resin composition as claimed in claim 1, wherein the butadiene unit content is 8 to 14% by weight based on the weight of the composition.

5. The styrene-based resin composition as claimed in claim 1, wherein the weight ratio of gel content to rubber-like polymer is 1.4:1 to 3.6:1.

6. The styrene-based resin composition as claimed in claim 1, wherein the swelling index is 7 to 18.

7. The styrene-based resin composition as claimed in claim 1, wherein the area average particle diameter is 0.2 to 0.6 $\mu$m.

8. The styrene-based resin composition as claimed in claim 1, wherein the ratio of the area particle diameter to the number average particle diameter is 1.0 to 1.6.

9. The styrene-based resin composition as claimed in claim 2, wherein the styrene-butadiene-based block copolymer comprises 10 to 90% by weight of a conventional diblock-type polymer and 90 to 10% by weight of a tapered block-type polymer;
the butadiene unit content is 8 to 14% by weight based on the weight of the composition;
the weight ratio of gel content to rubber-like polymer is 1.4:1 to 3.6:1;
the swelling index is 7 to 18;
the area average particle diameter is 0.2 to 0.6 $\mu$m; and
the ratio of the area particle diameter to the number average particle diameter is 1.0 to 1.6.

10. The styrene-based resin composition as claimed in claim 9, wherein the monomer copolymerizable with styrene is selected from the group consisting of $\alpha$-methylstyrene, vinyltoluene, vinylethylbenzene, vinylxylene, p-tert-butylstyrene, $\alpha$-methyl-p-methylstyrene, vinylnaphthalene, acrylonitrile, methyl methacrylate, methyl acrylate, methacrylic acid, acrylic acid, maleic anhydride, phenylmaleimide and mixtures thereof.

11. The styrene-based resin composition as claimed in claim 10, wherein the monomer copolymerizable with styrene is in an amount not more than 50% by weight based on the total weight of all monomers including styrene.

12. The styrene-based resin composition as claimed in claim 10, wherein the monomer copolymerizable with styrene is in an amount not more than 40% by weight based on the total weight of all monomers including styrene.

13. The styrene-based resin composition as claimed in claim 1, wherein the styrene-butadiene-based block copolymer has a weight average molecular weight of 50,000 to 300,000.

14. The styrene-based resin composition as claimed in claim 13, wherein the styrene-butadiene block copolymer is obtained using only styrene as a vinyl-based monomer and only 1,3-butadiene as a diolefin monomer.

15. The styrene-based resin composition as claimed in claim 1, wherein the styrene-butadiene based block copolymer comprises a 1,3-butadiene unit.

16. The styrene-based resin composition as claimed in claim 15, wherein part of the styrene unit is replaced by a vinyl-based monomer unit copolymerized with styrene in a proportion of not more than 50% by weight, based on the total vinyl-based monomer unit, and part of the 1,3-butadiene unit is replaced by a diolefin other than butadiene in a proportion of not more than 50% by weight based on the total diolefin-based monomer unit.

17. The styrene-based resin composition according to claim 16, wherein the vinyl-based monomer unit is selected from the group consisting of $\alpha$-methylstyrene, vinyltoluene, vinylethylbenzene, vinylxylene, p-tert-butylstyrene, $\alpha$-methyl-p-methylstyrene, vinylnaphthalene, acrylonitrile, methyl methacrylate, methyl acrylate, methacrylic acid, acrylic acid, maleic anhydride, phenylmaleimide and mixtures thereof.

18. The styrene-based resin composition according to claim 17, wherein the diolefin other than 1,3-butadiene is selected from the group consisting of isoprene, 1,3-pentadiene, 2,3-dimethyl-1,3-butadiene, 2-ethyl-1,3-butadiene, 2,3-diethyl-1,3-butadiene and 2,3-diphenyl-1,3-butadiene.

19. The styrene-based resin composition as claimed in claim 9, wherein the styrene-butadiene-based block copolymer has an average molecular weight of 50,000 to 300,000 and the styrene-butadiene block copolymer is obtained using only styrene as a vinyl-based monomer and only 1,3-butadiene as a diolefin monomer.

* * * * *